(12) United States Patent
Watarai

(10) Patent No.: US 9,334,910 B2
(45) Date of Patent: May 10, 2016

(54) LOCK MEMBER FOR FIXEDLY LOCKING A DISC BRAKE ROTOR ON A BICYCLE HUB

(71) Applicant: Shimano Inc., Sakai, Osaka (JP)

(72) Inventor: Etsuyoshi Watarai, Sakai (JP)

(73) Assignee: Shimano Inc., Osaka (JP)

( * ) Notice: Subject to any disclaimer, the term of this patent is extended or adjusted under 35 U.S.C. 154(b) by 94 days.

(21) Appl. No.: 14/288,395

(22) Filed: May 28, 2014

(65) Prior Publication Data

US 2015/0345577 A1    Dec. 3, 2015

(51) Int. Cl.
| | |
|---|---|
| *F16D 65/12* | (2006.01) |
| *B60B 27/00* | (2006.01) |
| *B60B 27/02* | (2006.01) |
| *F16D 65/02* | (2006.01) |

(52) U.S. Cl.
CPC .......... *F16D 65/123* (2013.01); *B60B 27/0052* (2013.01); *B60B 27/023* (2013.01); *F16D 65/12* (2013.01); *B60Y 2200/13* (2013.01); *F16D 2065/1348* (2013.01); *F16D 2065/1364* (2013.01); *F16D 2065/1376* (2013.01); *F16D 2065/1384* (2013.01); *Y10T 403/556* (2015.01)

(58) Field of Classification Search
CPC ..... F16D 65/123; F16D 65/12; F16D 65/134; F16D 2065/1356; F16D 2065/1384; F16D 2065/1388; B60B 27/0052; B60B 27/0047; B60B 27/0073; B60B 27/06; B60B 27/065; B60B 27/023; B62L 1/00; B62L 1/005; B62D 27/06; B62D 27/065
USPC ........... 301/108.1, 110.5, 6.8, 6.9; 188/24.11, 188/26, 218 XL; 152/68
See application file for complete search history.

(56) References Cited

U.S. PATENT DOCUMENTS

| | | | |
|---|---|---|---|
| 6,371,252 B1 | 4/2002 | Kanehisa | |
| 7,044,272 B2 * | 5/2006 | Takizawa | ................ F16D 65/12 188/17 |
| 7,665,584 B2 * | 2/2010 | Hirotomi | ............ B60B 27/0052 188/18 A |
| 2015/0034430 A1 * | 2/2015 | Nakakura | ............... F16D 65/12 188/218 XL |

* cited by examiner

*Primary Examiner* — John Walters

(57) ABSTRACT

A lock member for fixedly locking a disc brake rotor on a bicycle hub includes a base body, a first engagement portion engaged with a first coupling surface, which is included in a coupling portion that couples a rotor base body of the disc brake rotor to the bicycle hub, and a second engagement portion engaged with a second coupling surface, which is included in the bicycle hub. At least one of the first and second engagement portions includes a flexible member that projects from the base body.

24 Claims, 8 Drawing Sheets

Fig.6
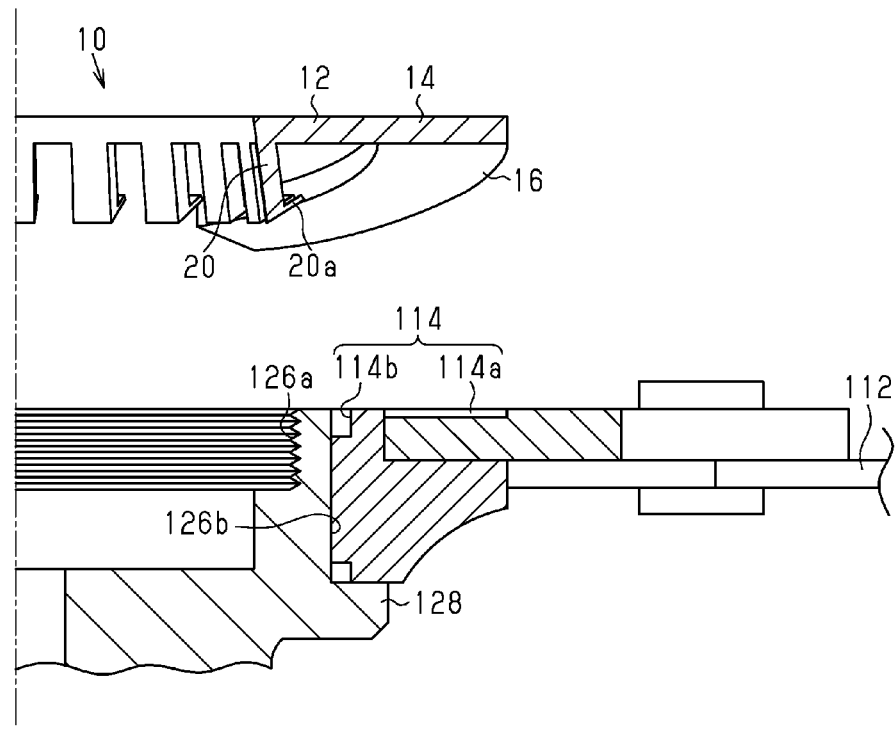
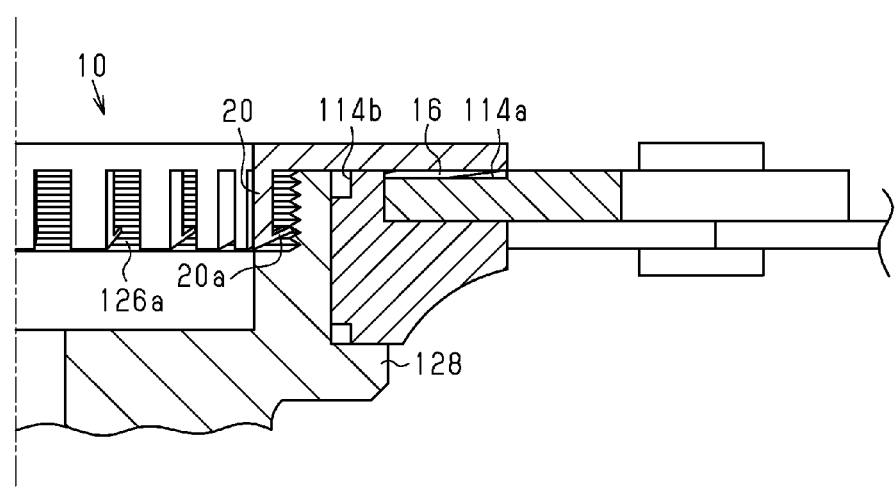

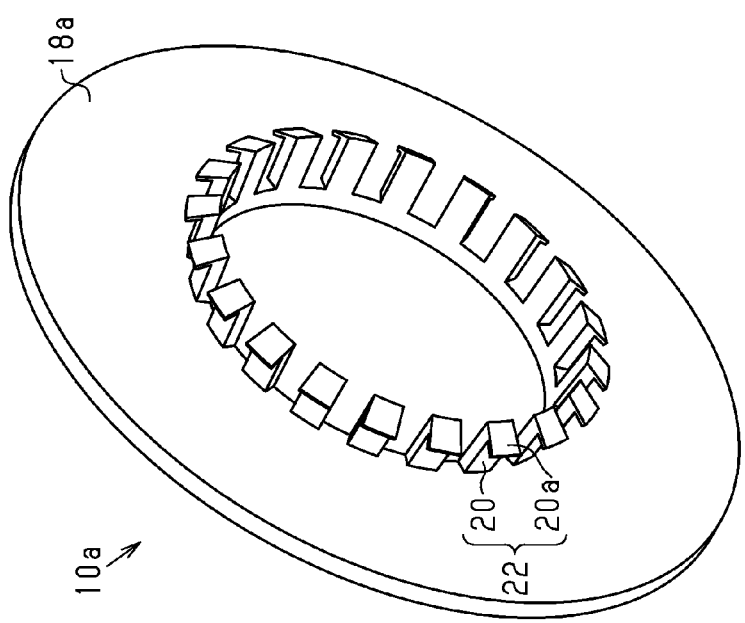
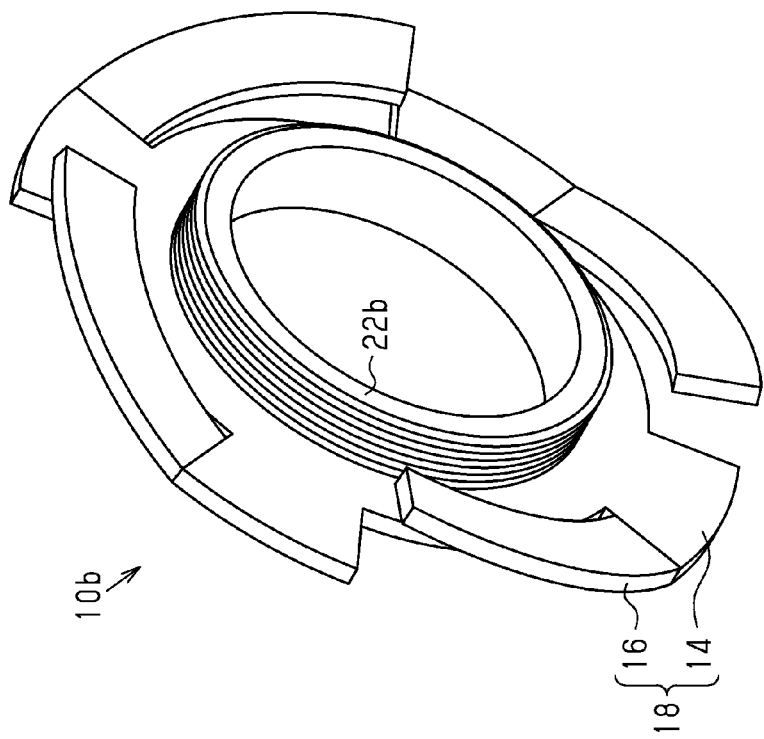

LOCK MEMBER FOR FIXEDLY LOCKING A DISC BRAKE ROTOR ON A BICYCLE HUB

TECHNICAL FIELD

The present invention relates to a lock member for fixedly locking a disc brake rotor on a bicycle hub.

BACKGROUND ART

One example of a lock ring that locks a disc brake rotor to a bicycle hub is described in U.S. Pat. No. 6,371,252 to Kanehisa, which is incorporated herein by reference. The bicycle hub includes a hub axle, which is fixed to a bicycle frame in a non-rotatable manner, and a hub shell, which is rotatably supported by the hub axle. One end of the hub shell includes a tubular mount, which extends outward in the axial direction to enter a center bore of a disc brake rotor, and a flange, which extends outward in the radial direction to contact the perimeter of the center bore in the disc brake rotor. The tubular mount includes a female-threaded inner circumferential surface.

The lock ring includes a central tube, which has a smaller diameter than the tubular mount of the hub shell, and a flange, which extends outward in the radial direction from the central tube. The central tube of the lock ring includes a male-threaded outer cylindrical surface. Each of the central tube and the flange is a rigid body.

A method for using the lock ring will now be described. First, the tubular mount of the hub shell is inserted into the center bore of the disc brake rotor. Then, the male-threaded portion of the central tube of the lock ring is engaged with the female-threaded portion of the tubular mount of the hub shell. The lock ring is rotated relative to the tubular mount so that the flange of the lock ring and the flange of the hub shell rigidly sandwich the disc brake rotor. In this manner, the lock ring fixedly locks the disc brake rotor to the bicycle hub.

SUMMARY

It is an object of the present invention to provide a novel structure for a lock member that fixedly locks a disc brake rotor to a bicycle hub.

A lock member according to a first embodiment of the present invention includes a base body, a first engagement portion engaged with a first coupling surface included in a coupling portion that couples a rotor base body of the disc brake rotor to the bicycle hub, and a second engagement portion engaged with a second coupling surface included in the bicycle hub. At least one of the first and second engagement portions includes a flexible member that projects from the base body.

In one example, the first engagement portion is located at a radially outer side of the base body.

In one example, the first engagement portion is engaged with an unsmooth surface included in the first coupling surface.

In one example, the first engagement member includes at least one first flexible member that urges the first coupling surface in an axial direction.

In one example, the first engagement portion includes a plurality of the first flexible members engaged with the first coupling surface.

In one example, the second engagement portion projects from the base body along a rotation axis.

In one example, the second engagement portion is engaged with a threaded surface included in the second coupling surface.

In one example, the second engagement portion has flexibility so that the second engagement portion moves over threads included in the threaded surface when force acts in an axial direction along a rotation axis.

In one example, the second engagement portion includes at least one second flexible member that projects from the base body along a rotation axis, and the second flexible member includes a distal end engaged with the second coupling surface.

In one example, the second engagement portion includes a plurality of the second flexible members.

In one example, the base body is an annular member.

In one example, the flexible member is a flexible cantilevered member.

In one example, the lock member further includes at least one rod-shaped member projecting from the base body along the rotation axis. The at least one rod-shaped member is inserted through at least one first hole included in the coupling portion and into at least one second hole located in the hub.

In one example, the rod-shaped member is configured to be separated from the base body when force that is greater than a predetermined value is applied to the base body in a circumferential direction.

In one example, the second flexible member of the second engagement portion includes a snap-fit element that is snap-fit to an internally threaded surface of the bicycle hub.

In one example, the base body is a flat annular member including an inner perimeter that defines a center opening. The snap-fit element is a flexible hook projecting from the inner perimeter of the base body along the rotation axis, and the flexible hook is inclined in a direction extending away from the rotation axis.

In one example, the flexible hook includes a claw that projects radially outward to engage the internally threaded surface of the bicycle hub.

In one example, the first engagement portion includes a plurality of radially-extending flat plates projecting outward from an outer perimeter of the base body and a plurality of outer blade springs respectively arranged on the plurality of radially-extending flat plates and extending in a circumferential direction along the outer perimeter of the base body. Each of the outer blade springs is inclined relative to the corresponding radially-extending flat plate.

In one example, the plurality of outer blade springs urge the first coupling surface of the coupling portion in an axial direction so that the coupling portion abuts against an abutment flange included in the bicycle hub.

In one example, the plurality of outer blade springs extend in a first circumferential direction about a rotation axis, and the plurality of outer blade springs include free ends that engage an unsmooth surface serving as the first coupling surface.

In one example, the first engagement portion and the second engagement portion is integrated with the base body to form a single member.

A second aspect of the present invention provides a disc brake rotor lock kit for use with a bicycle hub including an externally splined surface. The kit includes the lock member of the first aspect or the above-described examples and a coupling portion that couples a rotor base body of a disc brake rotor to the bicycle hub. The coupling portion includes an internally splined surface coupled with the externally splined surface and an unsmooth surface functioning as the first coupling surface.

A bicycle hub assembly according to a third aspect of the present invention includes the lock member of the first aspect or the above-described examples, a bicycle hub, and a coupling portion that couples a rotor base body of a disc brake rotor to the bicycle hub. The bicycle hub includes an externally splined surface and an internally threaded surface that functions as the second coupling surface. The coupling portion includes an internally splined surface coupled with the externally splined surface and an unsmooth surface functioning as the first coupling surface.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is a cross-sectional view shown the lock member before and after fixedly locking the disc brake rotor to the bicycle hub;

FIGS. 7 to 9 are perspective view showing lock members according to several modified examples;

DESCRIPTION OF THE EMBODIMENTS

Figure 1:
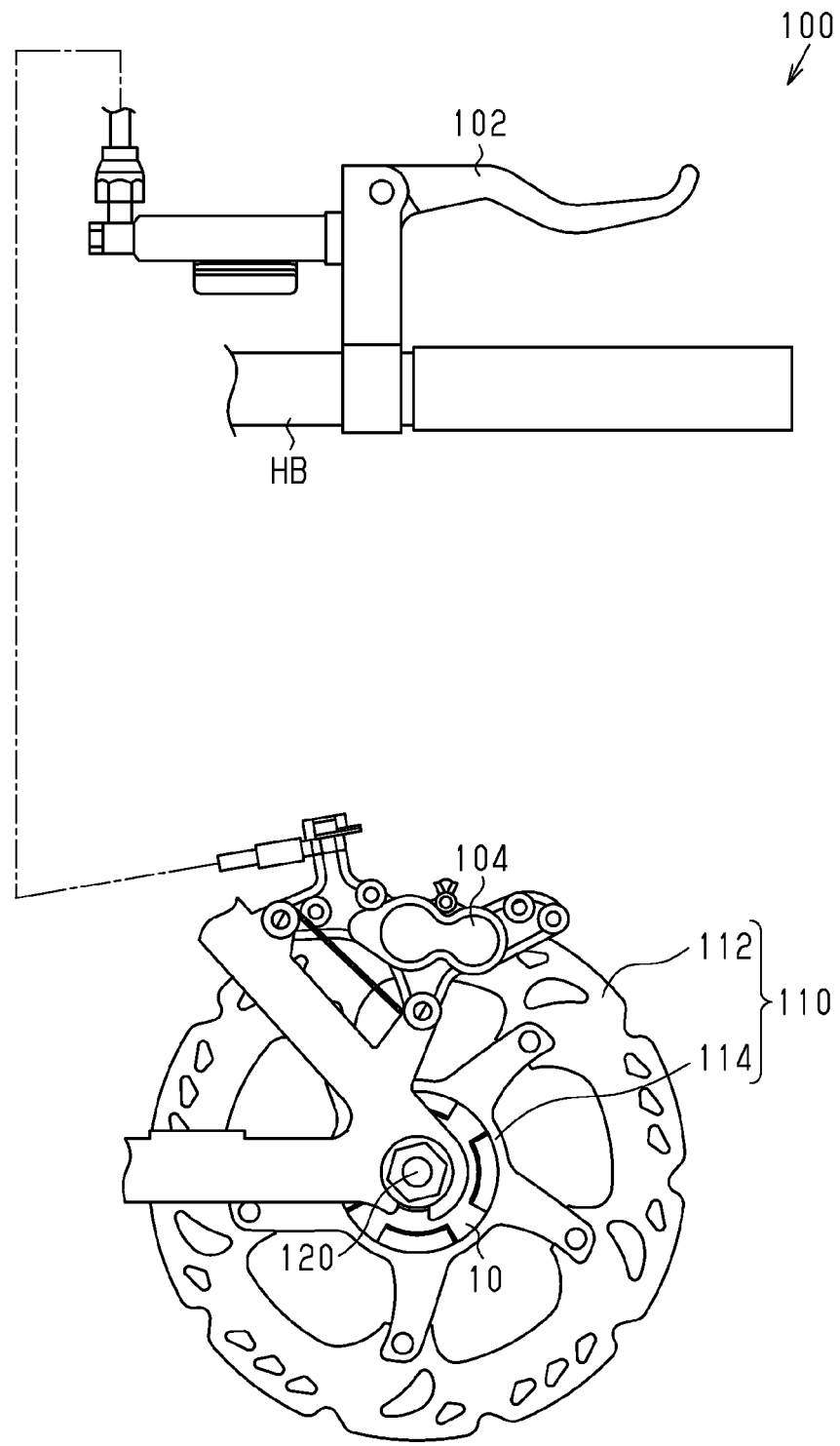
FIG. 1 is a schematic diagram of a disc brake system including a lock member according to an embodiment.

FIG. 1 shows a typical disc brake system 100 and a lock member 10 according to an embodiment that fixedly locks a disc brake rotor 110 to a bicycle hub 120. The typical disc brake system 100 includes a brake lever 102, which is fixed to a handlebar HB, and a brake caliper 104, which is fixed to the bicycle frame. When the brake lever 102 is pivoted, a piston is driven in the brake caliper 104 to push brake pads against a rotor base body 112 of the disc brake rotor 110. As a result, the brake caliper 104 generates a braking force. The disc brake rotor 110, the brake lever 102, and the brake caliper 104 that are used are known in the art and will not be described in detail.

Figure 2:
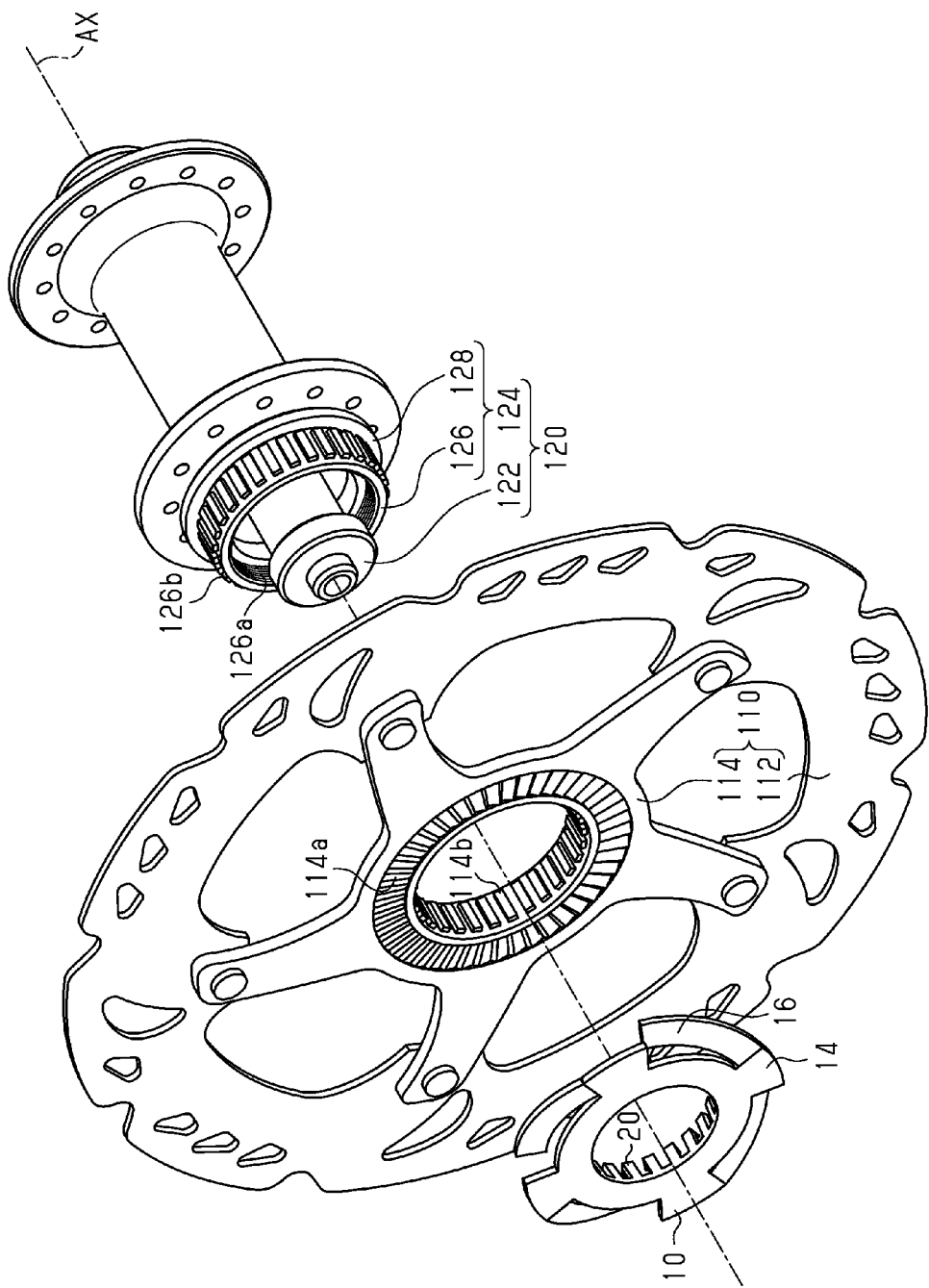
FIGS. 2 and 3 are perspective views of a bicycle hub assembly including the lock member, a disc brake rotor, and a bicycle hub.
Figure 3:
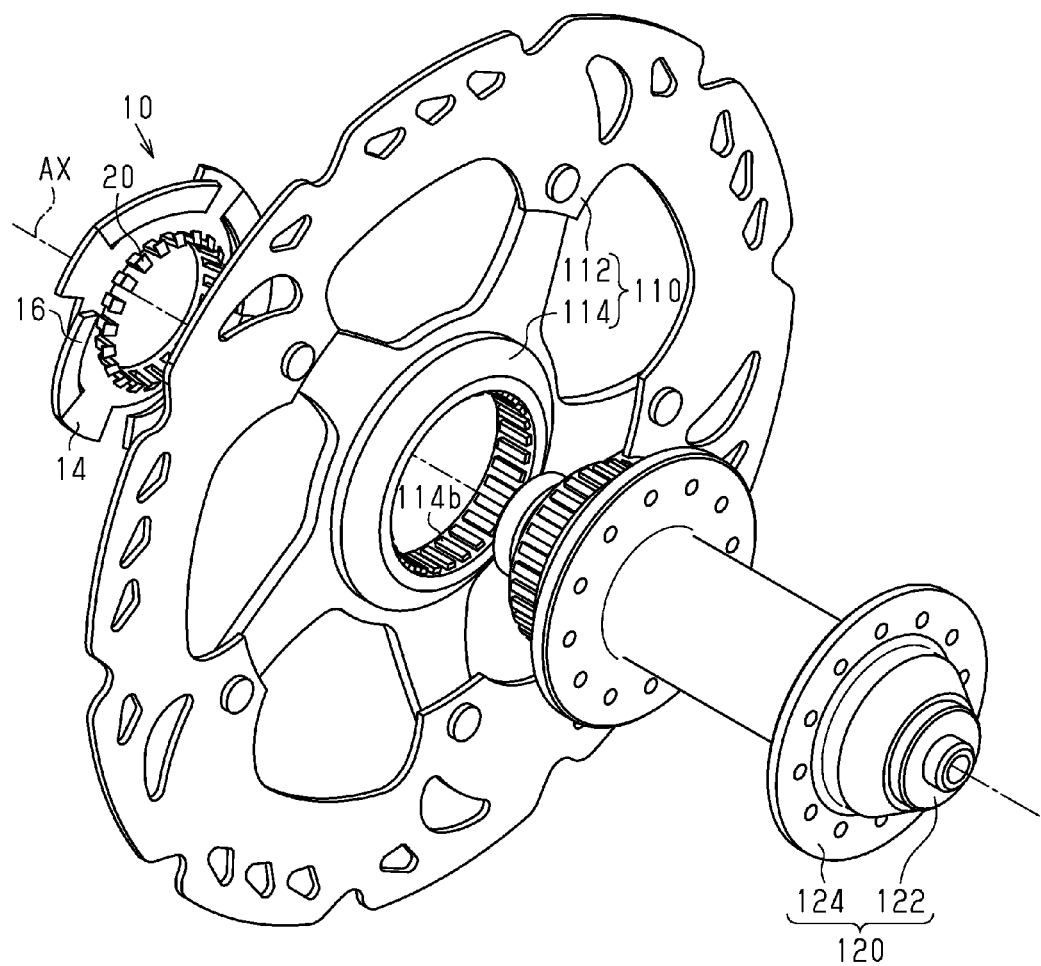

The disc brake rotor 110 and the bicycle hub 120 will now be described with reference to FIGS. 2 and 3.

The disc brake rotor 110 includes a rotor base body 112 and a coupling portion 114. The coupling portion 114 includes a first coupling surface 114a that may be an outer side surface of the disc brake rotor 110. The first coupling surface 114a may be an unsmooth surface. Although not particularly limited, the unsmooth surface may be, for example, a roughened surface, a knurled surface, a surface including regular or irregular protuberances, or a surface including regular or irregular grooves. In this embodiment, the inner circumferential surface of the coupling portion 114 includes an internally splined surface 114b. In one example, the coupling portion 114 is inseparable from the rotor base body 112. However, in another example, the coupling portion 114 may be separable from the rotor base body 112.

The bicycle hub 120 includes a hub axle 122, which is fixed to the bicycle frame, and a hub shell 124, which is rotatably supported by the hub axle 122. One end of the hub shell 124 includes a tubular mount 126, which outwardly extends along a rotation axis AX, and an abutment flange 128. The tubular mount 126 includes an internally threaded surface 126a, which may be referred to as a second coupling surface. The abutment flange 128 is configured to contact the coupling portion 114 at the inner side surface of the disc brake rotor 110.

The structure of the lock member 10 will now be described with reference to FIGS. 4 and 5.

The lock member 10 includes an annular member 12, a plurality of radially-extending flat plates 14, a plurality of outer blade springs 16 (outer peripheral blade springs), and flexible hooks 20. The annular member 12 includes an inner perimeter 12a, which defines a center opening, and an outer perimeter 12b. The radially-extending flat plates 14 outwardly project from the outer perimeter 12b of the annular member 12. The outer blade springs 16 extend in the circumferential direction along the outer perimeter 12b of the annular member 12. The flexible hooks 20 project from the inner perimeter 12a of the annular member 12 along the rotation axis AX and are inclined away from the rotation axis AX.

In this embodiment, the annular member 12 may be a flat annular member. The outer blade springs 16 may be arranged at equal angular intervals relative to the rotation axis AX. As shown in FIG. 5, each outer blade spring 16 is inclined relative to the corresponding radially-extending flat plate 14. As shown in FIG. 4, when viewing the upper surface of the lock member 10, the outer blade springs 16 extend in a first circumferential direction (e.g., a counterclockwise direction) about the rotation axis AX. Each outer blade spring 16 is a flexible, cantilevered member that includes a free end 16a. The outer blade spring 16 is one example of a first flexible member.

The upper view in FIG. 6 shows the flexible hooks 20 that project from the inner perimeter 12a of the annular member 12 along the rotation axis AX and incline in a direction extending away from the rotation axis AX. The flexible hook 20 includes a claw 20a that projects in the outward radial direction. The flexible hooks 20 are engaged with an internally threaded surface 126a, or the second coupling surface, of the hub shell 124. A flexible member like the flexible hook 20 included in the second engagement portion is one example of second flexible member, or a snap-fit element.

The outer blade springs 16, the radially-extending flat plates 14, and the flexible hooks 20 are integrated with the annular member 12 and form a single member.

The annular member 12 of the embodiment is one example of a base body. The radially-extending flat plates 14 and the outer blade springs 16 form one example of a first engagement portion 18 that is configured to engage the first coupling surface 114a of the coupling portion 114 in the disc brake rotor 110. The flexible hooks 20 and the claws 20a form one example of a second engagement portion 22 that is configured to engage the second coupling surface (126a) of the hub shell 124.

The operation of the lock member 10 will now be described with reference to FIGS. 2, 3, and 6.

First, the disc brake rotor 110 is coupled to the bicycle hub 120. For example, the internally splined surface 114b of the disc brake rotor 110 is engaged with an externally splined surface 126b of the tubular mount 126 of the hub shell 124. Under this situation, the lock member 10 is pressed into the disc brake rotor 110 and the bicycle hub 120 along the rotation axis AX.

The force pressing the lock member 10 in the axial direction engages the outer blade springs 16 with the first coupling surface 114a of the disc brake rotor 110. The outer blade springs 16 are resiliently deformed with the coupling portion 114 of the disc brake rotor 110 abut against the abutment flange 128 of the hub shell 124. The outer blade springs 16 generates a resilient repulsion force that pushes the coupling portion 114 of the disc brake rotor 110 in the axial direction. The resilient repulsion force urges the coupling portion 114 of the disc brake rotor 110 in the axial direction.

The force pressing the lock member 10 in the axial direction snap-fits the flexible hooks 20 to the hub shell 124 as the flexible hooks 20 move over the threads that are included in the internally threaded surface 126a of the hub shell 124. The flexible hooks 20 generate a resilient repulsion force that pushes the internally threaded surface 126a of the hub shell 124 in the outward radial direction.

In this manner, the disc brake rotor 110 is fixedly locked to the bicycle hub 120 with a sufficient locking force by engaging the outer blade springs 16 of the lock member 10 with the first coupling surface 114a of the disc brake rotor 110 and engaging the flexible hooks 20 of the lock member 10 with the second coupling surface 126a of the hub shell 124. The lock member 10 includes the flexible hooks 20. Thus, the lock member 10 may easily be locked to the bicycle hub 120 just by pressing the lock member 10 in the axial direction. Further, the lock member 10 includes the outer blade springs 16 that generate resilient repulsion force in the axial direction. This reduces loosening of the lock member 10.

Figure 4:
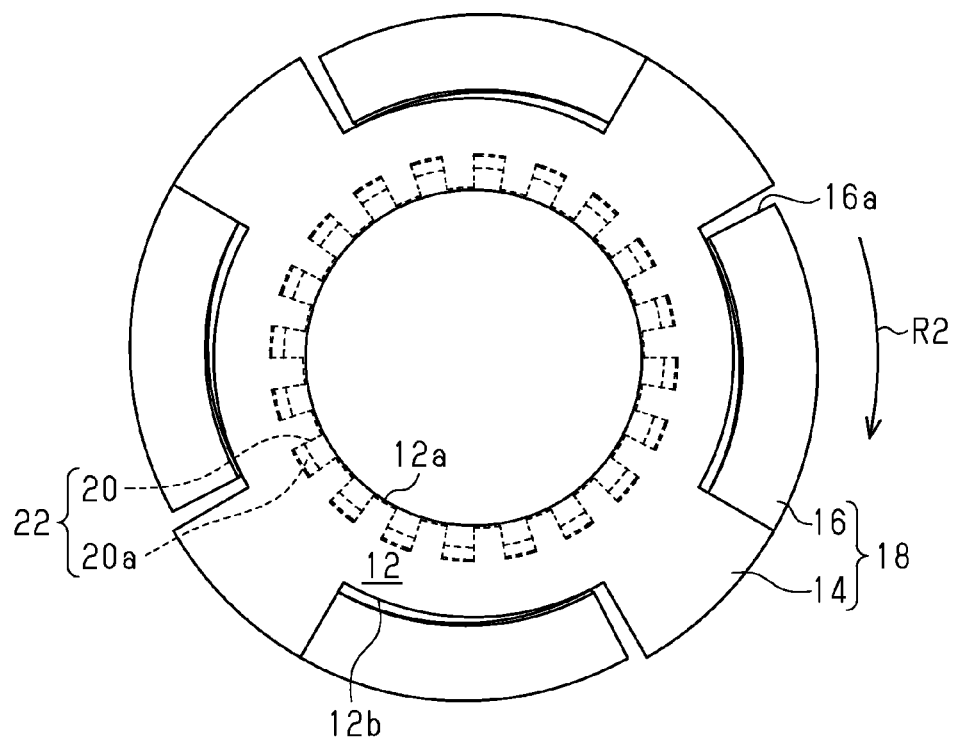
FIG. 4 is a plan view showing the lock member according to the embodiment.
Figure 5:
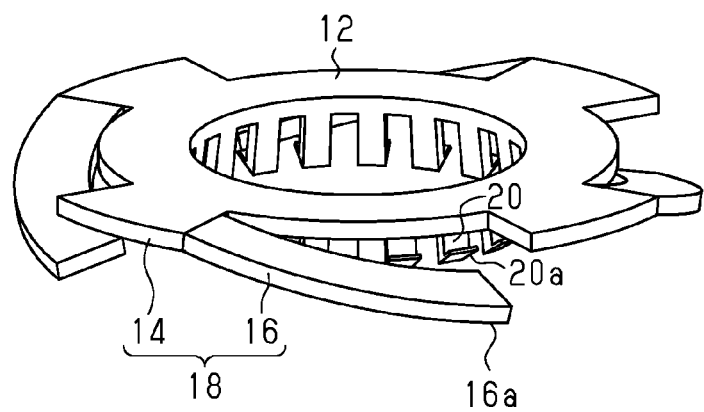
FIG. 5 is a perspective view showing the lock member of FIG. 4.

Referring to FIG. 4, the outer blade springs 16 extend in a first circumferential direction (counterclockwise direction) about the rotation axis AX. When the lock member 10 is fixedly locked to the disc brake rotor 110, the free ends 16a of the outer blade springs 16 are engaged with the unsmooth surface in the first coupling surface 114a of the disc brake rotor 110 to rotate only in a second circumferential direction R2 (clockwise direction) about the rotation axis AX in FIG. 4. Accordingly, when the lock member 10 is rotated in the second circumferential direction R2 against the locking force of the first engagement portion 18 and the second engagement portion 22, the lock member 10 can unlock the disc brake rotor 110 and remove the lock member from the hub shell 124. The lock member 10 of the embodiment is reusable subsequent to removal.

The method for manufacturing the lock member 10 is not particularly limited. In one example, a flexible material such as a synthetic resin is molded to manufacture the lock member 10. In another example, a cutting process and a bending process are performed on a flat blank plate to manufacture the lock member 10.

The embodiment has the advantages described below.

(1) The lock member 10 includes the base body 12, the first engagement portion 18, which engages the first coupling surface 114a that is included in the coupling portion 114 of the disc brake rotor 110, and the second engagement portion 22, which engages the second coupling surface 126a that is included in the bicycle hub 120. The first engagement portion 18 and/or the second engagement portion 22 includes a flexible member that projects from the base body 12. With this structure, the lock member 10 may engage, through the flexible members, the first coupling surface 114a of the disc brake rotor 110 and/or the second coupling surface 126a of the bicycle hub. Further, the lock member 10, which has a relatively simple structure, may apply a locking force that is sufficient for fixedly locking the disc brake rotor 110 to the bicycle hub.

(2) The first engagement portion 18 is located at the outer side of the base body 12 in the radial direction. With this structure, the lock member 10 may engage the first coupling surface 114a of the disc brake rotor 110 at the outer side of the base body 12.

(3) The first engagement portion 18 is engaged with an unsmooth surface included in the first coupling surface 114a. This structure reinforces the engagement of the first engagement portion 18 and the first coupling surface 114a and reduces loosening of the lock member 10 from the disc brake rotor 110.

(4) The first engagement portion 18 includes at least one first flexible member 16 that urges the first coupling surface 114a in the axial direction. With this structure, the resilient repulsion force generated in the axial direction by the first flexible member 16 not only reinforces the engagement of the first engagement portion 18 and the first coupling surface 114a but also reinforces the engagement of the second engagement portion 22 and the second coupling surface 126a of the bicycle hub 120. This reduces loosening of the lock member 10 from the disc brake rotor 110. Further, the flexibility of the first flexible member 16 contributes to reducing or weakening the transmission of vibration in the axial direction from the disc brake rotor 110 to the base body 12 of the lock member 10 when the bicycle is travelling. Accordingly, loosening of the lock member 10 from the disc brake rotor 110 is reduced.

(5) The first engagement portion 18 includes the first flexible members 16 that engage with the first coupling surface 114a. This structure allows the lock member 10 to stably engage the first coupling surface 114a. The desired urging force that is to be generated by the first engagement portion 18 is obtained by the cooperation of the first flexible members 16. This allows each first flexible member 16 to be thin or small. Further, the desired urging force generated by the first engagement portion 18 may be adjusted in accordance with the number, length, and thickness of the first flexible members 16.

(6) In this embodiment, the second engagement portion 22 projects from the base body 12 along the rotation axis AX. With this structure, the second engagement portion 22 may engage with the second coupling surface 126a of the bicycle hub 120 in a direction intersecting the rotation axis AX or a direction orthogonal to the rotation axis AX. For example, the flexibility of the second engagement portion 22 contributes to reducing or weakening the transmission of vibration in the radial direction from the bicycle hub 120 to the base body 12 of the lock member 10 when the bicycle is travelling. Accordingly, loosening of the lock member 10 from the disc brake rotor 110 is reduced. Preferably, the second engagement portion 22 is combined with the first engagement portion 18, which projects from the base body 12 in a direction intersecting the rotation axis AX or in a direction orthogonal to the rotation axis AX.

(7) The second engagement portion 22 is engaged with the threaded surface included in the second coupling surface 126a. With this structure, the second engagement portion 22 may be securely engaged with the threaded surface of the second coupling surface 126a. This securely couples the lock member 10 and the bicycle hub 120. Further, the lock member 10 may be removed from the bicycle hub 120 by rotating the lock member 10.

(8) The second engagement portion 22 has flexibility so that the second engagement portion 22 moves over the threads included in the threaded surface of the second coupling surface when force acts in the axial direction along the rotation axis AX. With this structure, the lock member 10 may easily fix the disc brake rotor 110 to the bicycle hub 120 just by pressing the lock member 10 in the axial direction without rotating the lock member 10.

(9) The second engagement portion 22 includes at least one second flexible member 20 that projects from the base body 12 along the rotation axis AX, and the second flexible member 20 includes a distal end engaged with the second coupling surface 126a. With this structure, the second flexible member 20 may generate resilient repulsion force in a direction intersecting or orthogonal to the rotation axis AX. The resilient repulsion force may be concentrated at the distal end of the second flexible member 20. This reinforces the engagement of the second engagement portion 22 and the second coupling surface 126a of the bicycle hub 120.

(10) The second engagement portion 22 includes the second flexible members 20. This structure allows the lock member 10 to be stably engaged with the second coupling surface 126a. The desired urging force that is to be generated by the second engagement portion 22 is obtained by the cooperation of the second engagement portions 22. This allows each of the second flexible members 20 to be thin or small. Further, the desired urging force that is to be generated by the second engagement portion 22 may be adjusted in accordance with the number, length, or thickness of the second flexible members 20.

(11) The base body 12 is an annular member. In this structure, for example, the first engagement portion 18 and the second engagement portion 22 may be respectively arranged on the outer perimeter 12b and the inner perimeter 12a of the annular member 12. Further, the annular member 12 contributes to reducing the weight of the lock member 10.

(12) The first flexible members 16 and the second flexible members 20 are flexible cantilevered members. In this structure, the first flexible member 16 and the second flexible member 20 project from different positions of the base body 12 in different directions. This allows for the application of resilient repulsion force to the first coupling surface 114a of the disc brake rotor 110 and the second coupling surface 126a of the bicycle hub 120.

(13) The second flexible member 20 includes a snap-fit element that snap-fits to the internally threaded surface 126a of the bicycle hub 120. This structure allows the lock member 10 to easily lock the disc brake rotor 110 to the bicycle hub 120.

(14) In a preferred example, the base body 12 is the flat annular member 12 including the inner perimeter 12a that defines the center opening. Further, the snap-fit element 20 of the second engagement portion 22 is the flexible hook 20 that projects from the inner perimeter 12a of the base body 12 along the rotation axis AS and inclines in a direction extending away from the rotation axis AX. With this structure, several or all of advantages (1) and (6) to (13) may be obtained.

(15) The flexible hook 20 includes the claw 20a that projects in the outward radial direction to engage the internally threaded surface 126a of the bicycle hub 120. With this structure, the flexibility of the flexible hook 20 may strengthen the engagement of the claw 20a and the internally threaded surface 126a.

(16) In the preferred example, the first engagement portion 18 includes the radially-extending flat plates 14, which outwardly project from the outer perimeter 12b of the base body 12, and the outer blade springs 16, which are respectively arranged on the radially-extending flat plates 14 and extend in the circumferential direction along the outer perimeter 12b of the base body 12. Each outer blade spring 16 is inclined relative to the corresponding radially-extending flat plate 14. With this structure, several or all of advantages (1) to (5) may be obtained. Further, the first engagement portion 18 may be manufactured in a simple process. In one example, the first engagement portion 18 may be formed by forming grooves or slits corresponding to the profile of the outer blade springs 16 in a flat blank plate and then bending the outer blade springs 16 relative to the radially-extending flat plates 14. In another example, the first engagement portion 18 may be formed by molding a flexible material such as synthetic resin.

(17) The outer blade springs 16 urge the first coupling surface 114a of the coupling portion 114 in the axial direction so that the coupling portion 114 abuts against the abutment flange 128 included in the bicycle hub 120. With this structure, the outer blade springs 16 cooperate with the abutment flange 128 of the bicycle hub 120 to resiliently hold the disc brake rotor 110 in the axial direction.

(18) The first engagement portion 18 and the second engagement portion 22 are integrated with the base body 12 to form a single member. This obtains the lock member 10 with a simple structure having sufficient lock force.

(19) The lock member 10 may be combined with the coupling portion 114, which includes the internally splined surface 114b and the unsmooth surface, to form a disc brake rotor lock kit. Preferably, the disc brake rotor fixing kit is used together with the bicycle hub 120, which includes the externally splined surface 126b. The disc brake rotor lock kit obtains several or all of advantages (1) to (18).

(20) The lock member 10 may be combined with the bicycle hub 120 and the coupling portion 114 to form a bicycle hub assembly. The bicycle hub assembly obtains several or all of advantages (1) to (18).

Several selected embodiments have been discussed to describe the present invention. However, the present invention is not limited to the foregoing embodiments (one or more of the embodiments). For example, the embodiments may be modified as described below.

Referring to FIG. 7, in a lock member 10a according to a first modified example, the first engagement portion 18a is a flange extending toward the outer radial direction of the base body 12 to engage the first coupling surface 114a. In the first modified example, the first engagement portion 18a does not include a first flexible member 16 like the outer blade spring 16. In the lock member 10a of the first modified example, the second engagement portion 22 includes the second flexible member 20. Thus, several or all of advantages (1), (6) to (13), and (18) to (20) of the embodiment may be obtained.

Referring to FIG. 8, in a lock member 10b according to a second modified example, a second engagement portion 22b is a male-threaded circular tube that projects along the rotation axis AX from the base body 12 to engage the second coupling surface 126a. In the second modified example, the second engagement portion 22b does not include a second flexible member 20 like the flexible hook 20. In the lock member 10b of the second modified example, the first engagement portion 18 includes the first flexible member 16. Thus, several or all of advantages (1) to (5) and (16) to (20) of the embodiment may be obtained.

Figure 9:
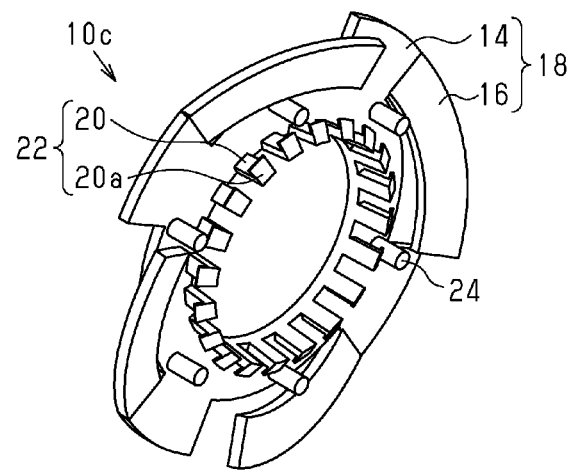
Figure 10:
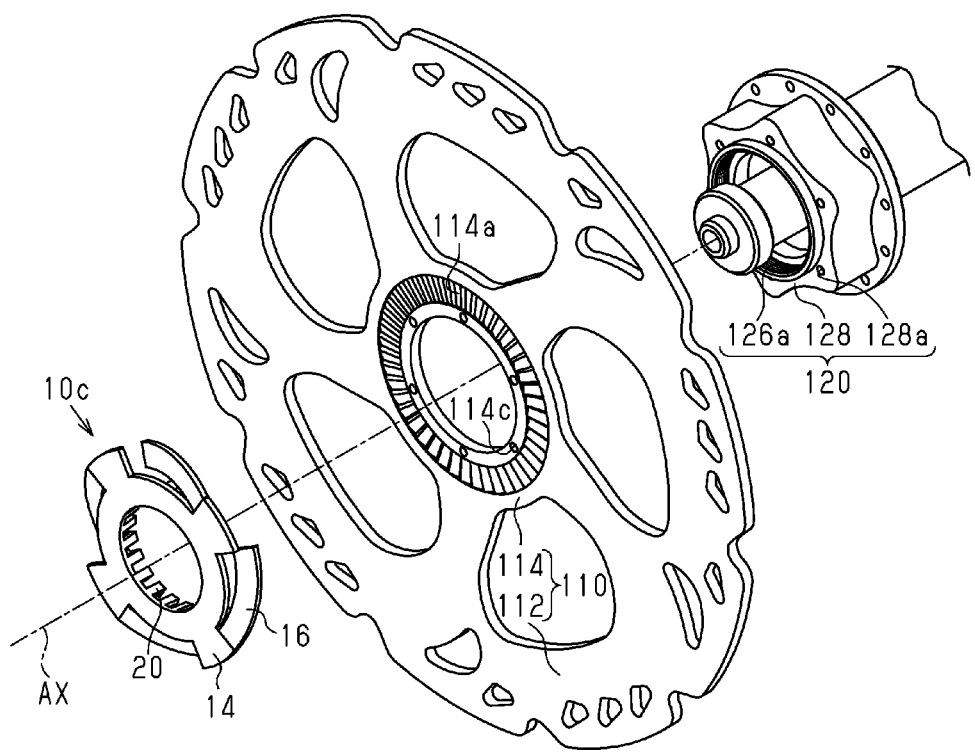
FIG. 10 is a perspective view showing a bicycle hub assembly including the lock member of FIG. 9, a disc brake rotor, and a bicycle hub.
Figure 11:
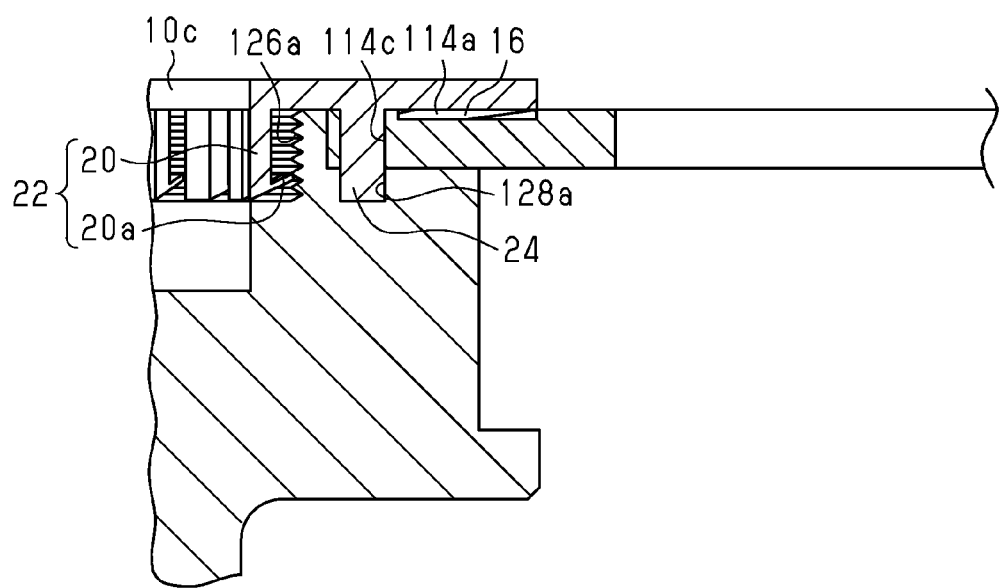
FIG. 11 is a cross-sectional view showing the lock member of FIG. 9 after locking the disc brake rotor to the bicycle hub.

Referring to FIG. 9, the lock member 10c according to a third modified example further includes at least one rod-shaped member 24 that projects along the rotation axis AX from the base body 12. As shown in FIGS. 10 and 11, the rod-shaped member 24 is inserted through at least one first hole 114c included in the coupling portion 114 into at least one second hole 128a located in the bicycle hub 120. The rod-shaped member 24 is configured to be separated from the base body 12 when the lock member 10*c* of the third modified example receives force in the circumferential direction that is greater than a predetermined value. For example, when removing the lock member 10*c* from the bicycle hub 120, relative rotation of the lock member 10*c* and the coupling portion 114 causes shearing that breaks and separates the rod-shaped members 24 from the base body 12. In this manner, the lock member 10*c* of the third modified example is of a so-called disposable type and differs from the lock members 10, 10*a*, and 10*b* that are described above. Otherwise, the lock member 10*c* of the third modified example is used in the same manner as the embodiment.

In the third modified example, the rod-shaped members 24 are engaged with the disc brake rotor 110 and the bicycle hub 120. This reduces loosening of the lock member 10*c* in the rotation direction. The lock member 10*c* of the third modified example is advantageous when, for example, the bicycle hub 120 and the disc brake rotor 110 are not spline-coupled. The third modified example obtains several or all of advantages (1) to (20).

In the embodiment and several modified examples, the number and position of the first flexible members 16 may be changed as required.

In the embodiment and several modified examples, the number and position of the second flexible members may be changed as required.

In the third modified example, the number and position of the rod-shaped members 24 may be changed as required.

In the third modified example, the bicycle hub 120 and the disc brake rotor 110 may be spline-coupled.

The lock member 10*a* of the first modified example may include the rod-shaped member 24 of the third modified example.

It should be apparent to those skilled in the art that the present invention may be embodied in many other specific forms without departing from the spirit or scope of the invention. For example, some of the components may be omitted from all components disclosed in the embodiments (one or more of the embodiments). Further, components in different embodiments may be combined. The present invention is not to be limited to the details given herein, but may be modified within the scope and equivalence of the appended claims.

The invention claimed is:

1. A lock member for fixedly locking a disc brake rotor on a bicycle hub, the lock member comprising:
    a base body;
    a first engagement portion engaged with a first coupling surface, which is included in a coupling portion that couples a rotor base body of the disc brake rotor to the bicycle hub; and
    a second engagement portion engaged with a second coupling surface, which is included in the bicycle hub,
    wherein at least one of the first and second engagement portions includes a flexible member that projects from the base body.

2. The lock member according to claim 1, wherein the first engagement portion is located at a radially outer side of the base body.

3. The lock member according to claim 1, wherein the first engagement portion is engaged with an unsmooth surface included in the first coupling surface.

4. The lock member according to claim 1, wherein the first engagement member includes at least one first flexible member that urges the first coupling surface in an axial direction.

5. The lock member according to claim 4, wherein the first engagement portion includes a plurality of the first flexible members engaged with the first coupling surface.

6. The lock member according to claim 4, wherein the first engagement portion includes
    a plurality of radially-extending flat plates projecting outward from an outer perimeter of the base body, and
    a plurality of outer blade springs respectively arranged on the plurality of radially-extending flat plates and extending in a circumferential direction along the outer perimeter of the base body,
    wherein each of the outer blade springs is inclined relative to the corresponding radially-extending flat plate.

7. The lock member according to claim 6, wherein the plurality of outer blade springs urge the first coupling surface of the coupling portion in an axial direction so that the coupling portion abuts against an abutment flange included in the bicycle hub.

8. The lock member according to claim 6, wherein
    the plurality of outer blade springs extend in a first circumferential direction about a rotation axis, and
    the plurality of outer blade springs include free ends that engage an unsmooth surface serving as the first coupling surface.

9. The lock member according to claim 1, wherein the second engagement portion projects from the base body along a rotation axis.

10. The lock member according to claim 1, wherein the second engagement portion is engaged with a threaded surface included in the second coupling surface.

11. The lock member according to claim 10, wherein the second engagement portion has flexibility so that the second engagement portion moves over threads included in the threaded surface when force acts in an axial direction along a rotation axis.

12. The lock member according to claim 1, wherein the second engagement portion includes at least one second flexible member that projects from the base body along a rotation axis, and the second flexible member includes a distal end engaged with the second coupling surface.

13. The lock member according to claim 12, wherein the second engagement portion includes a plurality of the second flexible members.

14. The lock member according to claim 12, wherein the second flexible member of the second engagement portion includes a snap-fit element that is snap-fit to an internally threaded surface of the bicycle hub.

15. The lock member according to claim 14, wherein
    the base body is a flat annular member including an inner perimeter that defines a center opening, and
    the snap-fit element is a flexible hook projecting from the inner perimeter of the base body along the rotation axis, and the flexible hook is inclined in a direction extending away from the rotation axis.

16. The lock member according to claim 15, wherein the flexible hook includes a claw that projects radially outward to engage the internally threaded surface of the bicycle hub.

17. The lock member according to claim 1, wherein the base body is an annular member.

18. The lock member according to claim 1, wherein the flexible member is a flexible cantilevered member.

19. The lock member according to claim 1, further comprising at least one rod-shaped member projecting from the base body along a rotation axis, wherein the at least one rod-shaped member is inserted through at least one first hole included in the coupling portion and into at least one second hole located in the hub.

20. The lock member according to claim 19, wherein the rod-shaped member is configured to be separated from the base body when force that is greater than a predetermined value is applied to the base body in a circumferential direction.

21. The lock member according to claim 1, wherein the first engagement portion and the second engagement portion is integrated with the base body to form a single member.

22. A disc brake rotor lock kit for use with a bicycle hub including an externally splined surface, the disc brake rotor lock kit comprising:
   the lock member according to claim 1; and
   a coupling portion that couples a rotor base body of a disc brake rotor to the bicycle hub, wherein the coupling portion includes an internally splined surface coupled with the externally splined surface and an unsmooth surface functioning as the first coupling surface.

23. A bicycle hub assembly comprising:
   the lock member according to claim 1;
   a bicycle hub including an externally splined surface and an internally threaded surface that functions as the second coupling surface; and
   a coupling portion that couples a rotor base body of a disc brake rotor to the bicycle hub, wherein the coupling portion includes an internally splined surface coupled with the externally splined surface and an unsmooth surface functioning as the first coupling surface.

24. The lock member according to claim 1, wherein the lock member is a one-piece member.

* * * * *